US009323053B2

(12) United States Patent
Lam

(10) Patent No.: US 9,323,053 B2
(45) Date of Patent: Apr. 26, 2016

(54) ACTIVE SHIELDING AGAINST INTENSE ILLUMINATION (ASAII) SYSTEM FOR DIRECT VIEWING

(71) Applicant: Nghia Trong Lam, Fountain Valley, CA (US)

(72) Inventor: Nghia Trong Lam, Fountain Valley, CA (US)

( * ) Notice: Subject to any disclaimer, the term of this patent is extended or adjusted under 35 U.S.C. 154(b) by 69 days.

(21) Appl. No.: 14/042,351

(22) Filed: Sep. 30, 2013

(65) Prior Publication Data

US 2015/0092083 A1 Apr. 2, 2015

(51) Int. Cl.
G02F 1/13 (2006.01)
G02B 27/01 (2006.01)
H04N 5/235 (2006.01)
G06T 7/00 (2006.01)

(52) U.S. Cl.
CPC .......... *G02B 27/0101* (2013.01); *G02B 27/017* (2013.01); *G06T 7/004* (2013.01); *H04N 5/2351* (2013.01); *G02B 2027/014* (2013.01); *G02B 2027/0118* (2013.01); *G02B 2027/0138* (2013.01); *G02B 2027/0178* (2013.01)

(58) Field of Classification Search
CPC .......... G02B 27/0101; G02B 27/0093; G02B 27/2264; G02B 27/017; H04N 5/2351; G06T 7/004
USPC .......................................................... 349/14
See application file for complete search history.

(56) References Cited

U.S. PATENT DOCUMENTS

| | | | | |
|---|---|---|---|---|
| 6,072,892 A * | 6/2000 | Kim | ............................... | 382/117 |
| 6,337,721 B1 * | 1/2002 | Hamagishi | ......... | G02B 27/2214 348/E13.029 |
| 7,970,172 B1 * | 6/2011 | Hendrickson | .............. | B60J 3/04 280/735 |
| 8,140,219 B2 * | 3/2012 | Cernasov | ............... | G02C 7/101 315/77 |
| 8,427,746 B2 * | 4/2013 | Si | ....................... | H04N 13/0418 345/4 |
| 8,681,174 B2 * | 3/2014 | Nam | .................. | H04N 13/0404 345/419 |
| 8,716,644 B2 * | 5/2014 | Wu | ........................... | B60J 3/04 250/203.4 |
| 2007/0188667 A1 * | 8/2007 | Schwerdtner | ........ | G02B 27/225 349/15 |
| 2009/0213283 A1 * | 8/2009 | Burlingame et al. | ........... | 349/14 |
| 2013/0128044 A1 * | 5/2013 | Zhang et al. | ................... | 348/148 |
| 2013/0214125 A1 * | 8/2013 | Solhusvik et al. | ......... | 250/208.1 |
| 2014/0036075 A1 * | 2/2014 | Kuhlman et al. | ............. | 348/148 |
| 2015/0001378 A1 * | 1/2015 | Magnusson et al. | .... | 250/214 AL |
| 2015/0062469 A1 * | 3/2015 | Fleury | ............................. | 349/14 |

* cited by examiner

*Primary Examiner* — James Dudek

(57) ABSTRACT

A technique/system using imaging cameras to detect and actively track intense light sources, such as the Sun, then provide electronically-generated and localized shades, via the Liquid Crystal Display (LCD) shutter screen imbedded on viewing glasses or windshields, tracking the intense projections as they traverse across the viewing glasses during dynamic motion allowing the viewer to directly and comfortably observe the scene with intense light sources and any displays or objects in direct or nearby line-of-sight that are normally washed-out by eye saturation due to extremely intense illumination. This intense illumination shielding technique/system can be used for providing improved vision in situations where the viewing location is confined relative to the primary viewing glasses where direct observation or see-through may occur with intense light sources in view from the near and far field and also with the entire system in a dynamic motion environment.

7 Claims, 6 Drawing Sheets

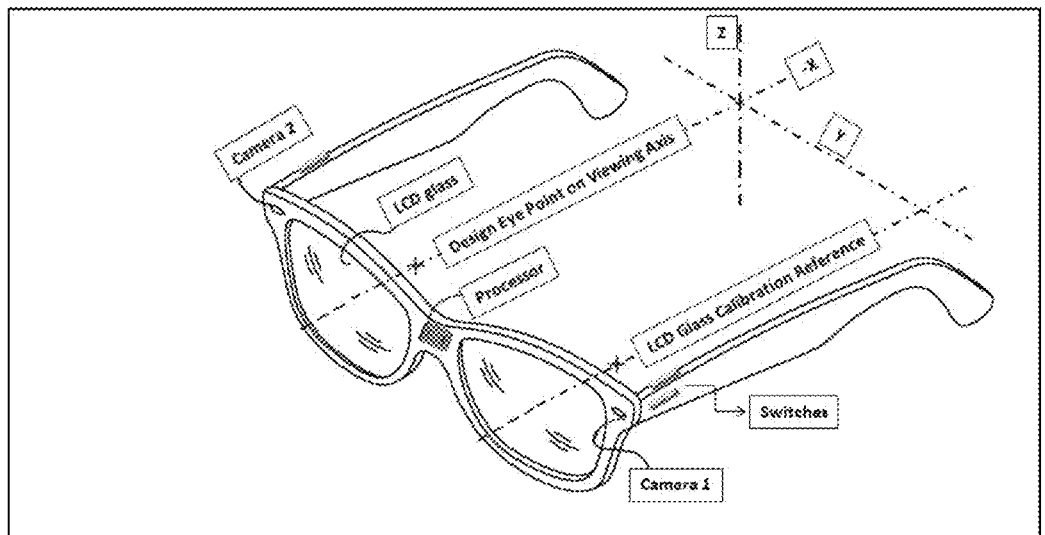
Figure 1: Active Sun Shade System Implementation in Sunglasses
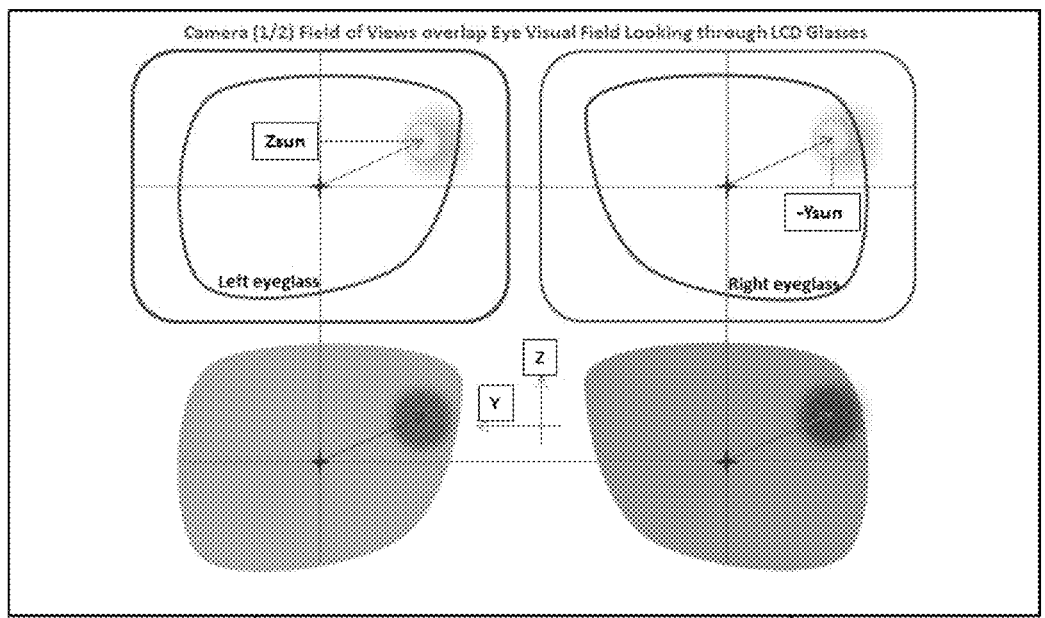
Figure 2: Active Sun Shade Illustration in Sunglasses

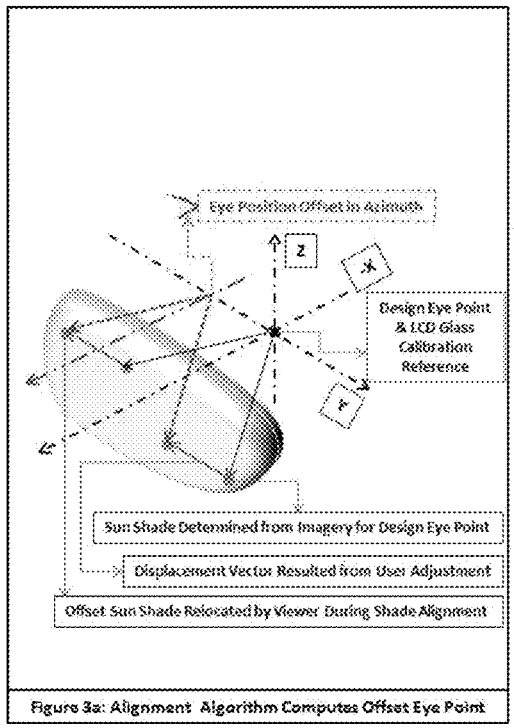
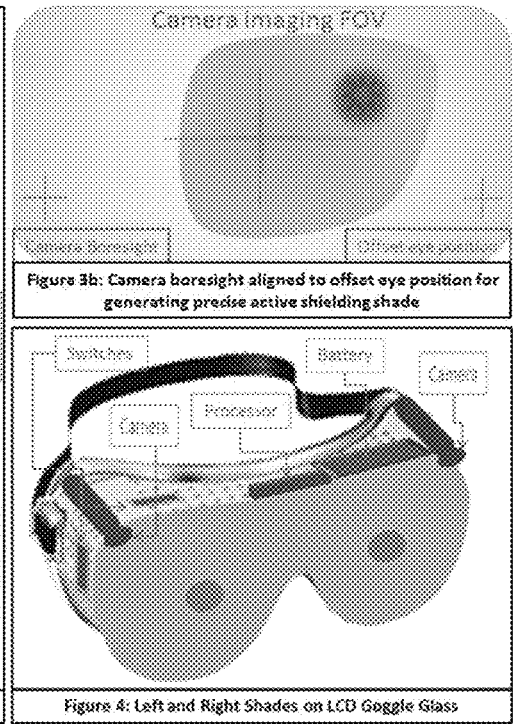
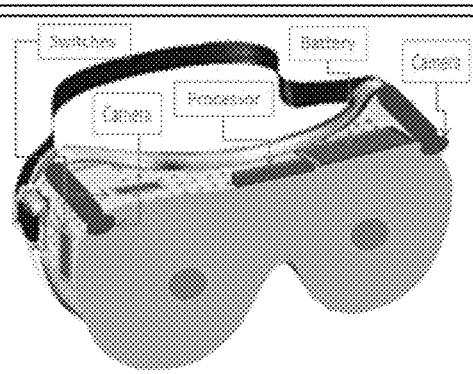
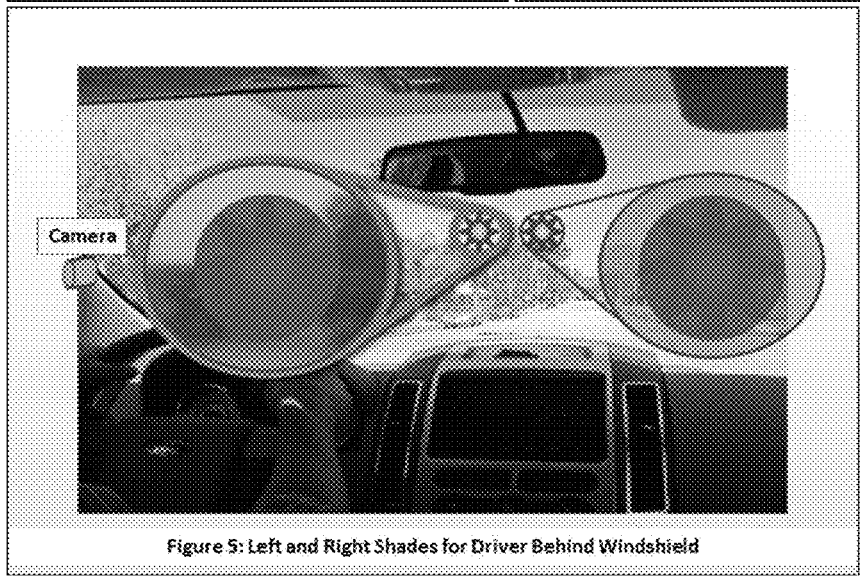

Figure 7a: Intense Sun Through Glass Roof
Figure 7b: ASAII system Provides Active Shade
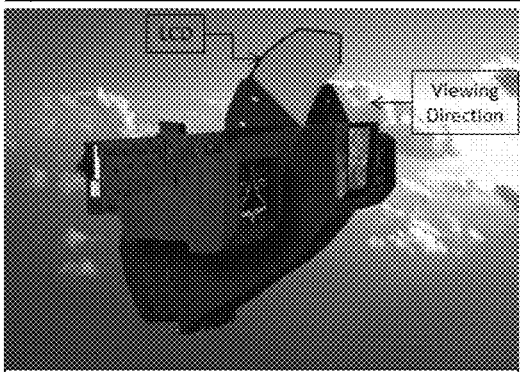
Figure 8: LCD Screen on Combiner Outside Surface
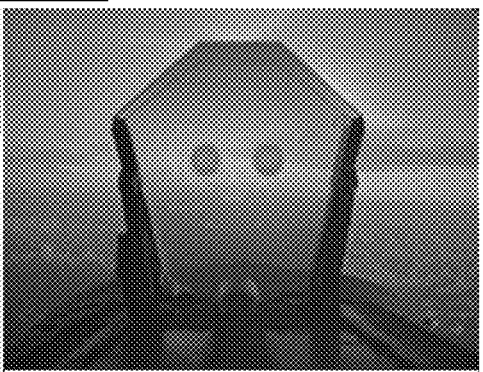
Figure 9: Left and Right Sun Shades on HUD with lighter background attenuation

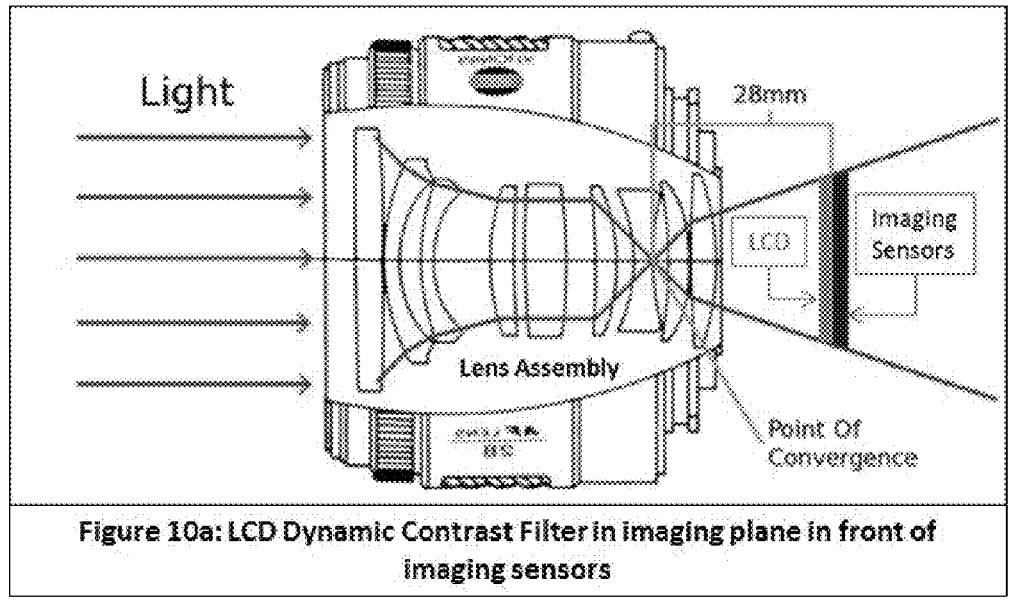
Figure 10a: LCD Dynamic Contrast Filter in imaging plane in front of imaging sensors
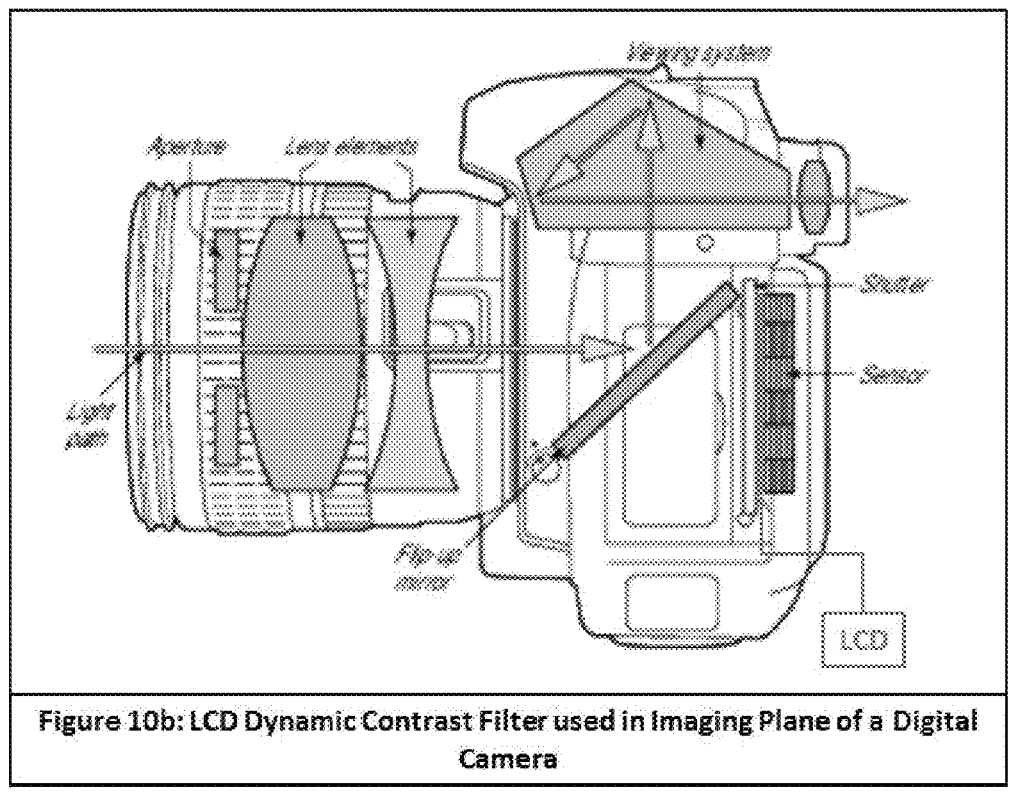
Figure 10b: LCD Dynamic Contrast Filter used in Imaging Plane of a Digital Camera

Figure 11a: Picture with intense Sun in background resulting darker objects of interest
Figure 11b: LCD Dynamic Contrast Filter allows for image of less intense Sun and better contrast for objects of interest in entire scene

ACTIVE SHIELDING AGAINST INTENSE ILLUMINATION (ASAII) SYSTEM FOR DIRECT VIEWING

PATENTS ON RELATED APPLICATIONS

| Patent No.: | Date: | Title: |
|---|---|---|
| U.S. Pat. No. 3,198,953 | Aug. 03, 1965 | Automatically Positioned Sun Mask for Sighting Devices |
| U.S. Pat. No. 3,961,181 | Jun. 01, 1976 | Eye-Shading Means for Automotive Vehicle Operators |
| U.S. Pat. No. 4,874,938 | Oct. 17, 1989 | Automatic Motor Vehicle Visor System |
| U.S. Pat. No. 5,258,607 | Nov. 02, 1993 | Active Anti-Dazzle Device for the Drivers of Cars and other Motor Vehicles Having an Electro-Sensitive Screen |
| U.S. Pat. No. 5,638,202 | Jun. 10, 1997 | Liquid Crystal Windshield Display |
| U.S. Pat. No. 5,714,751 | Feb. 03, 1998 | Automatic Visor for Continuously Repositioning a Shading Element to Shade a Target Location from a Direct Radiation Source |
| U.S. Pat. No. 6,244,703 B1 | Jun. 12, 2001 | Method and Apparatus for Calibration of an Electronic Vision Device |
| U.S. Pat. No. 6,811,201 B2 | Nov. 02, 2004 | Automatic Sun Visor and Solar Shade System for Vehicles |
| U.S. Pat. No. 7,199,767 B2 | Apr. 03, 2007 | Enhanced Vision for Driving |
| U.S. Pat. No. 7,347,479 B2 | Mar. 25, 2008 | Sunvisor Device for a Vehicle |
| U.S. Pat. No. 7,690,712 B2 | Apr. 06, 2010 | Antidazzle Apparatus for Movable Bodies |
| U.S. Pat. No. 8,070,209 B2 | Dec. 06, 2011 | Sun Visor |
| U.S. Pat. No. 8,140,219 B2 | Mar. 20, 2012 | Automatic Glare Reduction System for Vehicles |
| U.S. Pat. No. 8,143,563 B2 | Mar. 27, 2012 | Enhanced Glare Reduction |
| U.S. Pat. No. 8,350,204 B2 | Jan. 08, 2013 | Light Source Tracker |
| U.S. 2004/0119313A1 | Jun. 24, 2004 | Automatic Sun Visor and Solar Shade System for Vehicles |
| U.S. 2011/0050548 A1 | Mar. 03, 2011 | Head Up Display Utilizing an LCD and a Diffuser |
| U.S. 2012/0140125A1 | Jun. 07, 2012 | Aircraft Cockpit Visor Display |
| U.S. 2013/0076997A1 | Mar. 28, 2013 | Active Shutter Glasses, Passive, Glasses, and Stereoscopic Image Projection System |

BACKGROUND OF THE INVENTION

1. Field of the Invention

The present disclosure relates to intense light shielding or blocking methods, mechanisms, devices, and systems that detect and track intense light sources within a viewer field of vision/view (FOV) and then provide localized active shades against a globally lower and adjustable background attenuation via a Liquid Crystal Display (LCD) shutter screen allowing for an improved view of the world from behind viewing glasses in a dynamic motion environment.

Conventional mechanical Sun visors are not transparent and block a large portion of the FOV, limited sun coverage over FOV thus leaving the operator susceptible to direct sun illumination resulting in temporary blindness and also much discomfort from the additional heat. Sunglasses provide uniform shading effect reducing eye saturation when looking in the direction of the sun but also reduce the visibility of overall scene. Eyeglasses, visors, goggles, head-up display glasses/combiners, vehicle windows/windshields, glass-windows/roofs, aircraft cockpit glasses and overhead canopy in fighter planes are devices and applications that inherit disadvantages of conventional mechanical visor or tinting causing reduced visibility, much viewing fatigues, discomfort, and safety related risks for their operators. Other efforts, cited in patents on related applications, involved the use of large LCD panels to provide sun shade against large portions of the field of vision or the relative sun to human detection techniques suggested were cumbersome, archaic and not feasible for practical implementations.

This invention uses digital cameras to image the view of the world from out-of-the-cockpit or behind viewing glasses. The imagery is used to control an LCD shutter screen imbedded in sunglasses or windshields for casting localized active shades against a lower attenuation globally uniform or gradient background over the entire field of view in a dynamic motion environment. The objective is to image the intense light sources and to actively generate localized shades allowing the viewer to comfortably observe his surrounding without visual saturation effects caused by direct intense illumination while preserving visual acuity and sensitivity via a lower light attenuation background.

The Active Shielding Against Intense Illumination (ASAII) system can also be implemented as Dynamic Contrast filters for enhanced contrast imaging capability in digital optical systems. In these imaging applications, the ASAII system uses the LCD shutter screen behind the lens assembly in the imaging plane for casting localized active shades over saturated picture elements (pixels) against a selectable lower background attenuation allowing for higher contrast imaging capability bright backgrounds even with the sun in direct view.

2. Description of the Related Art

Liquid Crystal Display (LCD) shutter screens are widely used for imaging with back lighting in large high definition television systems. LCD screen provides light intensity modulation via electrically-controlled high-speed switching open and close of the picture elements causing variable light attenuation during image formation. LCD switching can achieve contrast ratio greater than 10,000:1 between the highest and lowest intensity picture elements (pixels) or even much better performance as evidently achieved in Liquid Crystal light modulators (amplitude modulator with rise and fall times in the neighborhood of 200 picoseconds for light pulsing or equivalently better than 2 MHz LCD shutter speed). When imbedded in viewing glasses, the LCD screen can be used to generate and cast locally active shades against an adjustable uniform or gradient background in dynamic motion environment.

The proliferation of digital imaging capability, in devices such as the mobile cellular phones, cameras and camcorders, has made this technology perfectly suitable for intense light/sun detection and tracking in a dynamic motion environment. Wide angle imaging cameras with a relatively simple image processing algorithm and adjustable intensity thresholds can be employed to detect and actively track the sun relative to the camera boresight or its imaging direction which shall be co-linearly aligned with the confined viewing direction from out-of-the cockpit or behind personal sunglasses.

Recent advances in the development of microprocessor offer many choices and possibilities in designing a relatively powerful processor that requires low power consumption. One can readily find similar types of processor used in applications such as smart credit cards, personal identification badges, and electronic wallets. For Active Sun Shade applications, the processor requires minimum computational power to accept user alignment input data via rocker switches, to perform Shade and Camera Boresight alignments, and to control the LCD screen switching operation. A small size low power processor may employ solar power source allowing for light weight and more fashionable stylistic sunglasses designs.

SUMMARY OF THE INVENTION

This invention presents a novel method/system to produce an active shield against intense light illumination for applications in a dynamic motion environment where the viewing position is relatively confined behind the viewing glass. Wide angle low resolution imaging cameras are proposed for dynamic detection and active tracking of the light source/sun in the co-linear plane with an observer located in a confined space with a same fixed viewing direction from behind a vehicle windshield or personal eyeglasses.

The objective is to provide the active shield where the illuminating object, the sun, is far from the observation point. Parallax effects are none existent between the occupant's view from his eye position and imaging camera view in the far field. The camera view is identical to the operator view when its imaging direction or its boresight is co-linearly aligned to the viewing direction of an observer from behind personal viewing glasses or from within a confined vehicle cockpit space. For viewing through the glass application, it is the glass shape, size, orientation and the specific eye location behind the glass that limit his/her total field of view; therefore the imaging camera FOV must cover the largest possible viewing angle in his perspective visual field through the glass.

A uniformly contiguous LCD shutter screen imbedded on the view-through glass surface is proposed for the active shutter function, the glass surface and its orientation relative to a specific viewing position will significantly affect the exact placement of the shade on the LCD glass for shielding for a fixed viewing location. Therefore, a LCD glass calibration database is required specifically for each unique glass surface (a typical manufacturing task) in different applications. This LCD glass calibration database shall compile sufficient samples to accurately represent the glass surface enabling the determination of uniquely addressable pixels in angular coordinates (Azimuth and Elevation) relative to its calibration boresight and reference. Typically the glass reference is designated at the same expected position, known as system Design Eye Point, for the viewer of the see-through scene. So when the actual viewer eye position coincides with system Design Eye Point and also co-linearly aligned with glass calibration direction, then a precise shade can easily be generated in the LCD glass pixel coordinates relative to its calibration reference.

In the line-of-sight to the sun and nearby vicinity on the viewing glasses, the LCD light attenuation can be controlled to the similarly high level achieved with metallurgic welding goggles allowing for the comfortable viewing of the sun and also any other nearby objects which will appear darker in contrast. While the remaining background attenuation can be selectable at much lower levels for comfortable viewing and maximum visibility range. As the light source traverses across the field of view, the LCD shading effect forms a negative shade image of the sun against a uniformly lighter background and when precisely superimposed on the actual dynamic scene it produces an eye-pleasing vantage point for observation through the viewing glasses, windshields, and windows.

The most important capability of this innovation is the Shade Alignment technique used to determine the exact viewing position in the confined space relative to the viewing glass when viewer's actual observation location is offset from the system Design Eye Point. The basis for this alignment concept is that even when viewer position is offset from the system Design Eye Point, the viewer line-of-sight to the sun still remained identical to the camera line-of-direction to the sun. This rationale allows for the Shade Alignment technique to determine the precise viewer eye position behind LCD glass with successive and sequential Shade Alignment adjustments from different directions in the FOV. This Shade Alignment technique involves the viewer interactively replaces a sun shade, initially generated for the system Design Eye Point, to precisely overlay the actual sun projection on the LCD glass via user input rocker switches/devices. FIG. 3a illustrates the Shade Alignment technique specifically shown for typical occurrences in eyeglasses where the viewer eyes are laterally displaced from the system Design Eye Position. Shade Alignment performed at several viewing perspectives in his FOV will converge more accurately on an actual observation location. A minimum of two shade adjustments are required for a solution because this technique only provides angular Sun direction.

Once the offset viewing position is determined, either for viewer eye position offset from center of glasses as just described or the system design eye point offset from center as in the driver/pilot seat relative to the windshield, the placement of active shades on the LCD shutter glass can be performed precisely by aligning the camera center boresight to the actual offset eye position for generating active shielding as shown in FIG. 3b.

For intense light sources that are in the near field, parallax effects between the camera and observers' eye positions are noticeably more significant and therefore multiple cameras are strategically used to resolve the parallax for individual eye position during precise placement of its active shade. In eyeglasses when the parallax is most significant in the horizontal direction between the eyes, only two cameras placed with a separation are needed in that particular direction to resolve parallax for all eye positions in between them as shown in FIG. 1. Similarly in applications where vertical parallax effects are significant, then another camera is needed with a vertical separation relative to one of the other cameras to concurrently resolve for parallax in the vertical direction. The parallax effects for near field light sources are accounted for during the Shade Alignment procedure described above for determination of the actual offset eye position of the viewer behind the LCD glass prior to its camera boresight alignment in the generation of localized active shielding shades.

Concept of Operation & Implementation Considerations

This invention uses digital cameras to image the world as seen through the eyeglasses or through the windshield view from inside a vehicle cockpit. These images of the world view are used to operate a Liquid Crystal Display shutter screen. The LCD screen will be electrically controlled to perform high speed switching of the individual picture elements allowing more light transmission for the background where the elements are opened more frequent and effectively reduce light intensity where the windows close more often reducing the intense sun illumination. The difficulties involved in precisely overlaying the negative sun shade image of the camera onto the LCD windshield or viewing glass precisely to cast an effective shadow allowing for a more eye-pleasing view in a dynamic motion environment. Low resolution, wide field of view cameras can provide adequate coverage of the total field of view for both pilot and co-pilot in aircraft cockpit or similarly in automobile compartment. The low resolution (~0.5 degree) imagery can be interpolated to produce a shade on a high-resolution LCD screen controlled with simple input thresholds, parameters and the a priori knowledge that the round sun will exceed a predetermined intensity while the background will be set for a uniformly lower attenuation level. The sun shade shall be a few degrees larger than the sun and its attenuation is set with logarithmic roll-off and adjustable gradient for a more natural shade effect. This implementation will prevent distinct outlines of visual anomalies associated with abrupt cut-offs representing real hard shade images in the near visual field. The occurrences of near field images in the same field of view where an operator is attempting to focus on the farther field scene may induce disorientation and motion sickness.

BRIEF DESCRIPTION OF THE DRAWINGS

FIG. 1 shows a candidate design layout for the Active Sun Screen system in eyeglasses.

FIG. 2 demonstrates the Active Sun Shade generated in Sunglasses.

FIG. 3a illustrates User Shade Alignment algorithm/technique for eyeglasses.

FIG. 3b Camera boresight aligned to offset eye position for generating precise active shielding shade.

FIG. 4 shows the Active Sun Shades in Goggles.

FIG. 5 demonstrates the Active Sun Screen application in vehicle windshield.

FIG. 6a illustrates Sun behind vehicle passenger window.

FIG. 6b displays the Active Shade for vehicle passenger window.

FIG. 7a shows the intense Sun through vehicle glass roof.

FIG. 7b shows the Active Sun Shade on vehicle glass roof.

FIG. 8 shows the LCD screen applied to the outside surface of the HUD combiner away from viewer.

FIG. 9 illustrates the Active Sun Shades in aircraft HUD with lighter background attenuation.

FIG. 10a illustrates the LCD Dynamic Contrast Filter located in the imaging plane in front of sensors.

FIG. 10b shows the LCD Dynamic Contrast Filter in the imaging plane of a digital camera.

FIG. 11a shows image with the intense sun in background resulting darker objects of interest.

FIG. 11b shows the LCD Dynamic Contrast Filter allows image of less intense sun and better contrast for objects of interest in entire scene.

DETAILED DESCRIPTION OF THE PREFERRED EMBODIMENTS

This Section will describe ASAII system applications in various preferred embodiments including Eyeglasses, Helmet Visors, Goggles, Vehicle Windshields/Glareshields, Viewing/See-through Glasses/Windows/Glass-roofs, Overhead Cockpit Canopy in fighter planes, Rear View Windows, Head-Up-Display (HUD), and Dynamic Contrast Filters for optical imaging systems. Vehicle windshield types include, but not limited to, cars, trucks, trains, golf carts, boats, aircraft, helicopters and glass roofs as such designs in large Sport Utility Vehicles (SUV), vans, buses, trucks, boats, trains and airplanes.

ASAII System in Personal Eyeglasses, Helmet Visors, Goggles

In an exemplary embodiment, the ASAII system in personal sunglasses includes multiple horizontal cameras with their imaging boresights co-linearly aligned with the viewing X-axis shown in FIG. 1. The LCD glass calibration reference is collocated with the system Design Eye Point. The nose bridge and arm mechanisms are designed for adjustment to align viewing direction through the X-axis in FIG. 1. Camera field of views shall provide adequate coverage for all eye viewing angles through the glasses. In this arrangement, the camera detection of an intense light source relative to its center boresight in azimuth and elevation angles can be used to cast shades on the LCD glasses. FIG. 2 illustrates the Sun shades generated for this particular condition where the Sun is detected and its corresponding shades are casted on LCD glasses at same azimuth and elevation angles (−Ysun,Zsun).

For the offset eye position in azimuth, FIG. 3a illustrates the Shade Alignment technique utilizing the user interactive inputs for a calibrated LCD glass at the system Design Eye Point to determine the actual viewer offset eye position for precise replacement of the active Sun shade. Initially, the ASAII system generated the Sun shade for the Design Eye Position. But with the actual offset eye position in azimuth, the Sun will also appear offset similarly in the same direction. The observer then uses the User Input Switches to relocate the shade to where the Sun actually appears producing the Displacement Vector in FIG. 3a. This Displacement Vector resulted from User adjustment is used with the initial Sun angular vector detected from the camera image to determine the offset eye position in azimuth. Subsequent Shade Alignment procedure performs identically at another quadrant of the viewing LCD glass produces yet another offset eye position vector to the same location. But sequential Shade Alignment at different quadrants will allow for the resolution of offset eye position in both azimuth and elevation angles when simultaneously occurred.

Once the offset eye position is located via the Shade Alignment procedure, FIG. 3b illustrates the alignment of the camera boresight to the offset eye position to generate the precise active shade using the Sun angular coordinates determined from the imagery.

The ASAII system implementation for Helmet Visors and Goggles will resemble more closely with the other preferred embodiment for Vehicle Windshields/Glareshields where multiple localized shades are casted on one LCD glass for right and left eyes (and also for multiple occupants in vehicle cockpits to be discussed in the next section). FIG. 4 shows the ASAII system generating the sun shades for left and right eyes on one LCD viewing glass of personal goggles. Similarly to the sunglasses, the Shade Alignment technique will allow the alignment of the shades to actual eye positions of viewer which may be offset from the Design Eye Positions. But the Shade Alignment must be performed for one eye at a time and the procedure is required as a calibration for the first time user.

ASAII System in Vehicle Windshields/Glareshields

In another embodiment of the Active Shielding in a vehicle windshield/glareshield, the driver/pilot is located along a fixed axis defined by the rails where his seat is located with the forward/aft, up/down controls and also recline capability to accommodate all operators from the smallest size to the unusually large human. So the vehicle seat forward and aft direction, side to side and the up/down directions will define the angular reference with specific settings of the seat position are then used to derive a driver/pilot Design Eye Point. As previously described for the ASAII application in eyeglasses, the Shade Alignment technique can be used to determine the actual offset eye positions for each individual different driver/pilot posture. The actual offset eye positions are then enable the alignment of the camera boresight for generating precise active shades as shown in FIG. 3b. The LCD glass calibration reference can be arbitrarily located at a known position for convenient use in the calculation for precise location of the active shades. The same steps described can be subsequently used to also locate the Co-Pilot/Passenger Design and offset eye positions for generating his/her active shades.

The Shade Alignment procedure is applicable for multiple occupants but it must be performed individually for specific eye positions and occupants. The ASAII system is capable of generating shades for both occupants in the cockpit. Depends on preference, a large shade casted for both eyes of an occupant or a pair of shades collocated for the average eye separation distance. In both cases, the oversize Sun shades, separation distances and gradient are user adjustable.

For the two shades per observer, each shade must be individually aligned to the actual left and right eye positions via the Shade Alignment procedure and each occupant shall require separate Shade alignment. On the other hand, the single large shade for both eyes of an occupant is practical since it allows for the most eye position movement and the angle between them is normally non-observable anyway. Any objects fall within this shade will appear darker in contrast to the intense sun and thus they are still observable.

The ASAII system used in vehicle windshield/glareshield is also highly effective for night operations against intense light sources such as headlights from oncoming traffics and/or intense light sources on the road that appear in the driver field of vision including direct laser illuminations. In these situations, the light sources are not from infinity but rather closer to the observer so that parallax effects between observer eye and actual camera location will become significant therefore the camera location relative to the observer will become critical. It shall be best to position the cameras at the eye level on the outer most edges on the car windshield as shown in FIG. 5 to minimize vertical parallax effects of oncoming automobile headlights. For aircraft glareshields, multiple cameras are optimally positioned at the four corners relative to known design eye positions for pilot and occupant thus enabling the accurate interpolation of intense light source line-of-sight relative to individual design eye position accounted for parallax in all directions.

ASAII System in Viewing Glasses/Windows/Glass Roofs/Aircraft Overhead Cockpit Canopy In another embodiment of this invention, the ASAII system is also highly effective for viewing or see-through glasses/windows, including glass roofs and aircraft overhead canopy, in vehicle which also exposes its occupant to direct intense Sun illumination causing much discomfort and significant visual impairment. In these applications, the camera imaging direction must be installed in the direction where the occupant remained relax as if he/she is viewing through the glass. In automobile or aircraft, the vehicle axes (forward and aft, side to side, up and down) in most cases will remain as reference, but the camera will be aligned along the axis in line with the direction from occupant position viewing through the glass to the outside world with the Sun potentially in the background. Different imaging cameras shall be required for the side windows and glass roofs. For all viewing windows facing one direction, two cameras should provide sufficient coverage and resolve for parallax.

FIG. 6a shows the intense Sun as seen through the passenger car window and FIG. 6b illustrates the ASAII system providing active shade for the passenger. LCD glass roof can provide individual shading for all occupants against a uniformly lighter background or it can provide the uniformly adjustable shade for the entire compartment. FIG. 7a shows the intense Sun through the glass roof and FIG. 7b illustrates the partial shade over the window with the active sun shade portion. The intense sun rays in both cases were resulted from the camera lens artifacts.

ASAII System in Vehicle Rear View Windows

In this embodiment, the ASAII system shall be able to provide shades for rear view windows such as in pickup trucks where the occupants are located very close to the rear window for maximum visibility but this also subjects them to uncomfortable intense sun or headlights of approaching traffics from behind when viewing the rear view mirror. The ASAII cameras shall be co-linearly aligned facing the rear end, but the Shade Alignment for the operator who has the rear viewing requirement will be performed for the Design Eye Position at the rear view mirror location. So when in operation, the ASAII system shall provide active shade for the driver who will be observing the rear view via the mirror as if he is located at the mirror position. For the remaining background, a user adjustable uniform shade shall provide a more comfortable condition for all occupants.

ASAII System in Head Up Displays (HUD)

Active shielding used in Head-Up Display devices represents another preferred embodiment of this invention. In wide-FOV HUD, the display is presented to the operator via a glass combiner. The HUD projected an image from infinity on the combiner inner surface where the operator also views through to the outside world. In conventional HUD designs, under normal circumstances when viewing the HUD in direct or nearby line-of-sight to the sun, the HUD display intensity is increased for improved contrast. But this technique quickly reached its limit resulting in display washout due to intense sun illumination.

For this application, the Active Shielding LCD screen should be applied to the HUD Combiner on the outside surface away from the viewer, as shown in FIG. 8, because the HUD display project its image from the inside Combiner surface toward the viewer. So that when the HUD viewing direction is on or nearby the line-of-sight to the sun then the active sun shade will limit the incoming light to the viewer and provide additionally improved contrast on HUD display especially over the FOV portion where direct sun illumination occurs as in FIG. 9. LCD shutter screen automatically increases light attenuation for increasingly brighter background and up to maximum attenuation when the sun is in the direct line of sight. For this HUD application, the cameras used for the forward looking windshield will also work because the HUD is generally aligned for the operator looking forward out of the cockpit windshield.

In this embodiment, the LCD Reflective HUDs, with curve combiner surfaces, shall require separate Shade Alignment adjustments for placement of the right and left-eye shades. And Refractive HUDs with planar surface combiners, only one adjustment needed for system Design Eye Position with an adjustable eye separation input. The selection of generating two shades is most appropriate since the HUD is designed for a fixed Design Eye Point.

Equally effective for night operations of HUD with or without Night Vision Goggle, landing lights from approaching airfield/airport or near-field reflection from onboard aircraft lights often reduce display contrast and increasing HUD display intensity with higher level of combiner backscatter will also reduce the far field visibility. The Active LCD Screen can be employed to reduce the near field runway backscatter light on the lower portion of the combiner for improved HUD display while allowing for maximum visibility range for the far field with lower overall background light attenuation on the corresponding higher portion of the combiner where maximum visibility range is critical for detection and identification of threats that are frequently launched from for the highest chance of success (i.e., shoulder launch surface-to-air missiles, or any other potential threats on airport perimeter).

ASAII System in Cameras as Dynamic Contrast Filters

In this embodiment, the ASAII system shall provide the dynamic contrast filter for minimal glaring and more visually clearer with higher contrast imaging capability in cameras. Similarly as neutral density filters in cameras, the active LCD shutter screen when employed in the imaging plane, as shown in FIG. 10a and FIG. 10b, where the light sensitive elements are used to form the image can provide reduced light exposure for the whole scene with the uniformly constant or gradient background attenuation. In addition, it can also cast active shades locally where the intense light sources appeared. The camera itself provides the image to determine local regions where light intensity exceeds the user adjustable threshold. Both attenuation levels for background and local shades can be recorded with the image such that post image processing can reverse and reduce the effect of the active shade if and when necessary. This ASAII Dynamic Contrast Filter shall allow for much better imaging capability with brighter background especially when the sun is in or near the line of sight which normally causes darken effects or low contrast of nearby objects of interest. Great cares must be given to the design and placement of the LCS shutter screen within the proximity of the imaging elements to ensure minimal shade blurring effects. Because the Active LCS shutter screen is co-located in the imaging plane where the light sensors are used in forming the image, it is considerably much easier to cast the shade for the image and no shade alignment nor camera boresight alignment are needed.

FIG. 11a shows a typical image with the intense sun in the background producing low contrast for objects of interest and overall scene. In FIG. 11b, the simulated LCD Dynamic Contrast Filter provides the uniformly lower background attenuation for the upper half and the gradient shade for the right half of the image with an even higher attenuation radial gradient filter for the local region where the Sun appears. Notice the resulting image has a much better contrast for objects of interest and overall scene. In actual camera applications, the LCD Dynamic Contrast Filters will provide gradient filters with smoother transition for both background and the local Sun region of the image producing more naturally better contrast images even with the Sun in the background.

Alternatively, the Dynamic Contrast filter effects of casting localized and global background shades can also be accomplished in digital imaging systems via the variable exposure times for individual pixels controlled by intensity thresholds that are user selectable. The innovation concept is casting localized and global background gradient shades over specific image regions that are extremely bright limiting saturation and thus allowing for more exposure times in regions where the average image intensity is lower thus enabling the Dynamic Contrast filter effects of producing an overall higher image contrast in extremely high ambient background light scenes.

While the invention has been described with various components and reference to preferred embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. An active shielding against intense illumination (ASAII) system comprising:
   two wide-angle imaging cameras with field of views (FOV) large enough for tracking intense illumination sources covering a field-of-view of an observer; wherein the two wide-angle cameras resolve the parallax effects associated with near field illumination sources for the observer's specific eye position; wherein the two wide-angle cameras' imaging directions are co-linearly aligned with a viewing direction of the observer through a transparent viewing glass;
   the transparent viewing glass imbedded with a liquid crystal display (LCD) shutter screen for modulating the intensity of the transmitted light creating shades overlaying the intense illumination sources; for precise LCD shutter glass operation in the ASAII system, the following control mechanisms and glass specific database are required:
      LCD shutter glass control switches for taking initial ASAII system calibration inputs from the observer to precisely align the shade location on the LCD shutter glass during viewing adjustment for a shade alignment and a camera boresight alignment; wherein the inputs comprise adjustments for shade location, oversize/roll-off gradient and variable background light attenuation levels;
      a LCD shutter glass calibration database performed at an arbitrary reference for the determination of individually addressable pixels at a specific angular location in azimuth and elevation relative to its reference on viewing axis (unique for each individual glass); the database also allows for accurate determination of a shade displacement vector on LCD shutter glass surface performed during the shade alignment when observer precisely relocates the shade, initially generated at the system design eye point, to overlay the intense illumination for precise determination of an actual viewing eye position in 3-dimensions relative to the transparent viewing glass;
   a processor programmed:
      to control the operation of the wide-angle cameras, to read observer inputs from LCD control switches, to store LCD glass calibration database, to perform shade alignment and camera boresight alignment to the actual viewing eye position, and to control the operation of the active LCD shutter glass;
      to determine an initial viewing position of the observer derived from an adjustable seat position; the initial viewing position will be used in the initial shade location at a system design eye point prior to exercising the shade alignment for precise determination of the actual eye point location; for eyeglasses, the system design eye point is an arbitrarily designated location;
      to perform the shade alignment that computes the actual eye point location, for the case when it is offset relative to the system design eye point, from shade displacement data obtained when observer successively and precisely relocates the electronically-generated shade, initially generated for the system design eye point, over where the intense source actually and dynamically appears on the LCD shutter glass in different viewing directions at two different locations within the field of view of the observer; the process allows for precise determination of the actual observer eye position in 3-dimensions relative to the transparent viewing glass;

to perform the camera boresight alignment of the co-linearly aligned cameras to the actual eye point location that was previously determined in the shade alignment, so that the angular coordinates of the intense sources detected by the cameras are directly transferred to this actual eye point location for the precise generation and placement of active shades on the LCD shutter glass effectively shielding the eye for direct viewing.

2. The ASAII system according to claim 1, wherein the ASAII system is used in personal eyeglasses, helmet visors, goggles, vehicle windshields/glareshields, vehicle side/rear-view windows and glass-roofs, for casting localized active shades against a lower background light attenuation shielding the observer from intense illumination for enhanced visions; the active shades automatically track and neutralize intense light projections as they traverse across the LCD glasses allowing for comfortable direct viewing while preserving visual sensitivity and maximum visibility range over the entire field of view in a dynamic motion environment.

3. The ASAII system according to claim 1, wherein the ASAII system employs a plurality of cameras for resolving parallax providing active shielding in vehicle windshields/glareshields for enhanced vision and operation in low light conditions during night times where headlights from approaching traffics in the near field or intense background light sources caused visual interferences.

4. The ASAII system according to claim 1, wherein the ASAII system casts localized active shades on fighter plane overhead cockpit glass canopy providing improved pilot's vision by permitting direct viewing of the scene with intense illumination sources and maximum visibility range via lower background light attenuation offering potentially life and death advantages in close range aerial combats/dog fights.

5. The ASAII system according to claim 1, wherein the ASAII system provides active shielding against intense illumination in vehicle/aircraft Head Up Display (HUD) combiner for display contrast enhancement and maximum see-through visibility range in high ambient background conditions even when the sun is in direct line-of-sight and night operations with or without night vision goggles (NVG).

6. The ASAII system according to claim 1, wherein the ASAII system implemented in personal eyeglasses, visors and/or vehicle windshields/glareshields, will provide active shielding from intense light sources and direct laser illuminations, including lasers operating in the visible, Infra-red and Ultra Violet spectrum, while permitting for enhanced vision in the remaining field of view via user selectable/adjustable background attenuation proper for day and night conditions; light/laser sources within viewer's field of vision must be detected by the co-linearly aligned camera which will trigger the LCD shutter for maximum attenuation thus protecting his vision from permanent damage; additional system prerequisites including the light detection/processing speed, LCD shutter switch-on time and its maximum attenuation level are utmost important factors that required design attention to guaranty eye damage protection.

7. The ASAII system according to claim 1, wherein the ASAII system provides localized and global background shades via the LCD shutter screen in the imaging plane of digital cameras and optical imaging systems limiting light saturation allowing for enhanced contrast imaging capability with intense illumination source(s) in field of view.

* * * * *